United States Patent
Kim et al.

(10) Patent No.: US 11,658,544 B2
(45) Date of Patent: May 23, 2023

(54) SHAPE MEMORY ALLOY ACTUATOR FOR CONTROLLING COOLANT FLOWRATE TO A ROTOR OF AN ELECTRIC MOTOR

(71) Applicant: GM Global Technology Operations LLC, Detroit, MI (US)

(72) Inventors: Wonhee Michael Kim, Royal Oak, MI (US); SeungHwan Keum, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 164 days.

(21) Appl. No.: 17/398,095

(22) Filed: Aug. 10, 2021

(65) Prior Publication Data
US 2023/0047629 A1    Feb. 16, 2023

(51) Int. Cl.
*H02K 9/19* (2006.01)
*F03G 7/06* (2006.01)
*H02K 1/32* (2006.01)
*B60K 1/00* (2006.01)

(52) U.S. Cl.
CPC ............. *H02K 9/19* (2013.01); *F03G 7/0614* (2021.08); *H02K 1/32* (2013.01); *B60K 1/00* (2013.01); *B60K 2001/006* (2013.01)

(58) Field of Classification Search
CPC ........ H02K 9/19; H02K 1/32; H02K 2213/09; F03G 7/0614; B60K 1/00; B60K 2001/006
USPC ........................................................ 310/53
See application file for complete search history.

(56) References Cited

U.S. PATENT DOCUMENTS

| | | | | |
|---|---|---|---|---|
| 4,550,695 A | * | 11/1985 | Kikuchi | F01P 7/081 192/82 T |
| 4,789,132 A | * | 12/1988 | Fujita | F16K 31/04 137/219 |
| 4,848,652 A | * | 7/1989 | Kennedy | F01P 7/167 236/34.5 |
| 4,895,301 A | * | 1/1990 | Kennedy | G05D 23/1393 236/34.5 |
| 9,068,666 B2 | * | 6/2015 | Roby | F16H 25/2266 |
| 9,404,444 B2 | * | 8/2016 | Sano | F02M 26/68 |
| 9,927,041 B2 | * | 3/2018 | Jackson, Jr. | F16K 31/5282 |
| 2008/0216775 A1 | * | 9/2008 | Repple | F04D 29/468 123/41.1 |
| 2010/0126598 A1 | * | 5/2010 | Peric | F16K 3/26 137/625.48 |
| 2014/0021384 A1 | * | 1/2014 | Kabel | F16K 31/047 251/129.01 |
| 2018/0202569 A1 | * | 7/2018 | Kawase | F16K 1/44 |

* cited by examiner

*Primary Examiner* — Alex W Mok
(74) *Attorney, Agent, or Firm* — Vivacqua Crane, PLLC

(57) ABSTRACT

A rotor for an electric motor includes a rotor core defining a first face, a second face, and an opening extending from the first face to the second face. The rotor also includes an output shaft received by the opening of the rotor core and a valve disposed within a passageway of the output shaft. The valve controls a flowrate of the coolant and is actuated into a fully opened position at a maximum operating temperature of the rotor. The valve includes a stem having a first end portion and a second end portion, a plug disposed at the first end portion of the stem, a valve seat disposed opposite to the plug, and a shape memory alloy actuator that expands to urge the stem of the valve and the plug away from the valve seat and into the fully opened position at the maximum operating temperature.

20 Claims, 6 Drawing Sheets

SHAPE MEMORY ALLOY ACTUATOR FOR CONTROLLING COOLANT FLOWRATE TO A ROTOR OF AN ELECTRIC MOTOR

INTRODUCTION

The present disclosure relates to a shape memory alloy actuator for controlling the coolant flowrate to a rotor of an electric motor. More particularly, the present disclosure relates to a valve including a shape memory alloy actuator placed within a passageway of an output shaft of the rotor, where the shape memory alloy actuator controls the flowrate of the coolant provided to the rotor.

Interior permanent magnet motors are widely used in electric vehicles. In particular, interior permanent magnet motors may be used as the prime mover of a powertrain for an electric vehicle. An interior permanent magnet motor includes a rotor with permanent magnets embedded within a core of the rotor. Depending on the operating conditions, an interior permanent magnet motor may generate excessive heat, which in turn causes the permanent magnets embedded within the core of the rotor to become susceptible to demagnetization. As a result, the rotor and a stator of the interior permanent magnet motor may be cooled in order to prevent demagnetization of the permanent magnets. For example, in one approach, coolant may flow through channels located within the rotor and a stator of the interior permanent magnet motor.

Separate cooling requirements exist between the rotor and the stator of an interior permanent magnet motor, since the heat generation between these two components differ widely based on operating conditions. As a result, the rotor and stator may have separate cooling requirements. However, different coolant flowrates for the rotor and stator require separate temperature sensing, control, and actuation components. Specifically, a temperature sensor is provided to monitor rotor temperature, and when the rotor temperature exceeds a threshold value the valve is opened. However, this approach adds cost and complexity to the interior permanent magnet motor. Moreover, it is to be appreciated that the temperature sensor requires telemetry, which further increases complexity and may create maintenance issues for the interior permanent magnet motor.

Thus, while current cooling systems for interior permanent magnet motors achieve their intended purpose, there is a need in the art for an improved, cost-effective approach to provide separate coolant flowrates to the rotor and stator of an interior permanent magnet motor.

SUMMARY

According to several aspects, a rotor for an electric motor is disclosed, and includes a rotor core comprising a plurality of laminations. The rotor core defines a longitudinal axis, a first face, a second face, and an opening extending from the first face to the second face of the rotor core, where the opening is oriented along the longitudinal axis. The rotor also includes an output shaft received by the opening of the rotor core, where the output shaft defines a passageway extending along the longitudinal axis that receives coolant. The rotor also includes a valve disposed within the passageway of the output shaft, where the valve controls a flowrate of the coolant and is actuated into a fully opened position at a maximum operating temperature of the rotor. The valve includes a stem having a first end portion and a second end portion, a plug disposed at the first end portion of the stem, a valve seat disposed opposite to the plug, and a shape memory alloy actuator disposed along the second end portion of the stem that expands to urge the stem of the valve and the plug away from the valve seat and into the fully opened position when the rotor is at the maximum operating temperature.

In another aspect, the valve includes a base flow position, and the valve is actuated from the base flow position into the fully opened position.

In yet another aspect, the shape memory alloy actuator is constructed of a shape memory alloy having a phase transition temperature.

In still another aspect, the phase transition temperature of the shape memory alloy is about equal to the maximum operating temperature of the rotor.

In another aspect, the electric motor is a permanent magnet motor.

In yet another aspect, the maximum operating temperature of the rotor is about equal to a demagnetization temperature.

In still another aspect, the shape memory alloy actuator is constructed of a shape memory alloy including a martensitic state and an austenitic state.

In another aspect, the shape memory alloy is in the martensitic state when the valve is in a base flow position.

In yet another aspect, the shape memory alloy is in the austenitic state when the valve is in the fully opened position.

In still another aspect, the shape memory alloy actuator is a coil spring, a leaf spring, a wire that expands and contracts, or a cable including a plurality of wires.

In another aspect, the valve comprises a biasing member positioned along the first end portion of the stem, where the biasing member is compressed when the valve is in a base flow position.

In another aspect, the biasing member exerts a biasing force in a direction that opposes a compressive force exerted upon the biasing member when the valve is in the base flow position.

In yet another aspect, the shape memory alloy actuator is compressed when the valve is in the base flow position.

In another aspect, the shape memory alloy actuator expands and exerts an actuation force in a direction opposite to the compressive force exerted by the biasing member when the shape memory alloy transitions from a martensitic state to an austenitic state.

In another aspect, the actuation force exerted by the shape memory alloy actuator when transitioning from the martensitic state to the austenitic state is greater than the compressive force exerted upon the biasing member when the valve is in the base flow position.

In one aspect, a housing assembly for an electric motor is disclosed. The housing assembly includes a main body defining an upper sump and a lower sump, where the upper sump contains a coolant. The housing assembly also includes an electric motor located below the upper sump and above the upper sump of the main body, where the electric motor includes a rotor. The rotor includes a rotor core comprising a plurality of laminations, where the rotor core defines a longitudinal axis, a first face, a second face, and an opening extending from the first face to the second face of the rotor core, where the opening is oriented along the longitudinal axis. The rotor also includes an output shaft received by the opening of the rotor core, where the output shaft defines a passageway extending along the longitudinal axis that receives the coolant from the upper sump. The rotor includes a valve disposed within the passageway of the output shaft, where the valve controls a flowrate of the coolant and is actuated into a fully opened position at a maximum operating temperature of the rotor. The valve includes a stem having a first end portion and a second end portion, a plug disposed at the first end portion of the stem, a valve seat disposed opposite to the plug, and a shape memory alloy actuator disposed along the second end portion of the stem that expands to urge the stem of the valve and the plug away from the valve seat and into the fully opened position when the rotor is at the maximum operating temperature.

In another aspect, the valve includes a base flow position, and the valve is actuated from the base flow position into the fully opened position.

In yet another aspect, the shape memory alloy actuator is constructed of a shape memory alloy including a martensitic state and an austenitic state.

In still another aspect, the shape memory alloy is in the martensitic state when the valve is in the base flow position.

In another aspect, the shape memory alloy is in the austenitic state when the valve is in the fully opened position.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
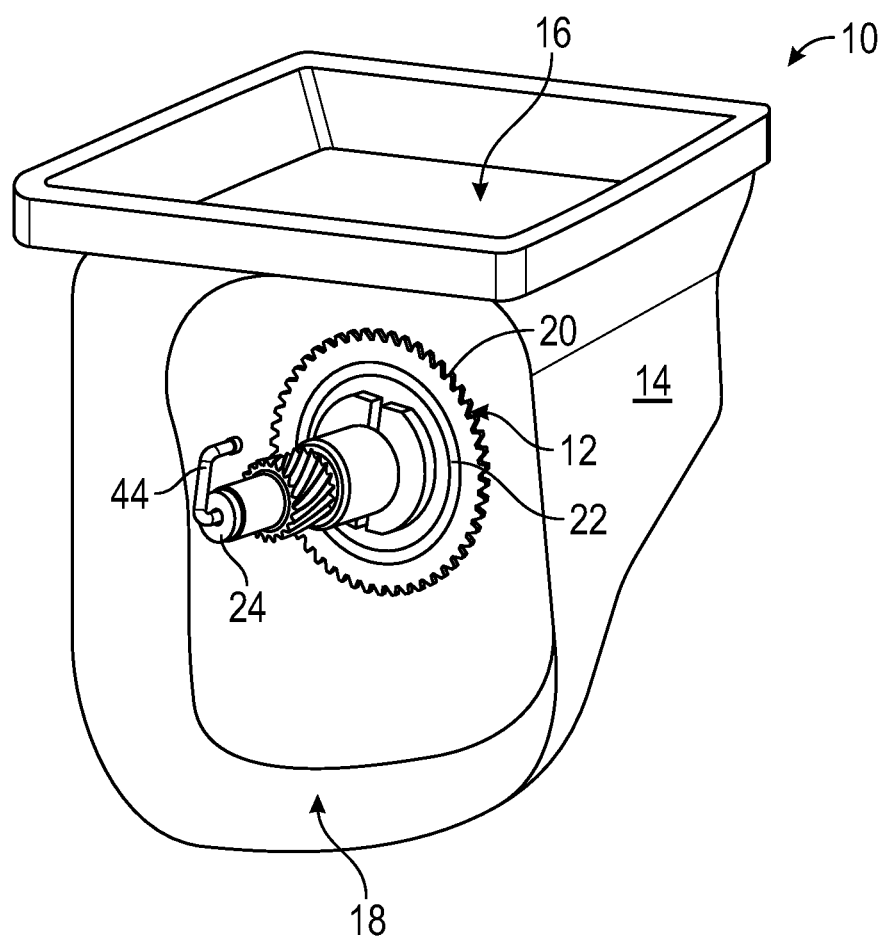
FIG. 1 is a perspective view of a housing containing an electric motor including a stator, a rotor, and an output shaft, according to an exemplary embodiment.

Referring to FIG. 1, an exemplary housing assembly 10 containing an electric motor 12 is illustrated. The housing assembly 10 includes a main body 14 that defines an upper sump 16 and a lower sump 18. The upper sump 16 of the housing assembly 10 is located above the electric motor 12 and contains a coolant provided to the electric motor 12. The lower sump 18 is located below the electric motor 12 and collects the coolant from the electric motor 12. In one non-limiting embodiment, the housing assembly 10 is part of a vehicle such as an automobile. For example, in one embodiment, the electric motor 12 may be the prime mover for a powertrain of an electric vehicle. The electric motor 12 includes a stator 20, a rotor 22, and an output shaft 24 that is part of the rotor 22. The coolant stored in the upper sump 16 draws heat from the electric motor 12. Specifically, a cooling channel (not shown) connected to the upper sump 16 of the housing assembly 10 transports coolant to the electric motor 12. It is to be appreciated that the coolant is split between the stator 20 and the rotor 22 at a fixed ratio. Some examples of coolant that may be used include, but are not limited to, ethylene glycol, dielectric fluids, automatic transmission fluid, or another liquid cooling agent.

Figure 2:
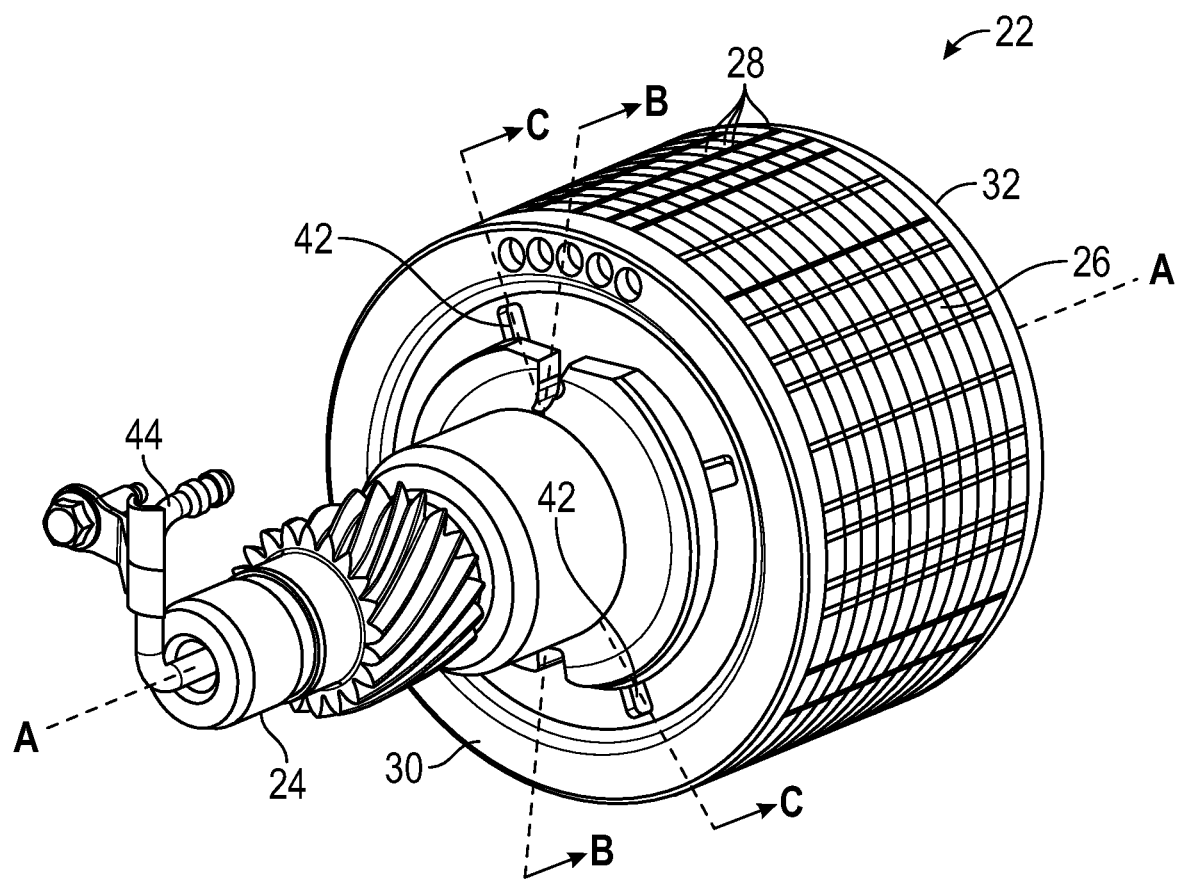
FIG. 2 is a perspective view of the rotor of the electric motor, according to an exemplary embodiment.
Figure 3:
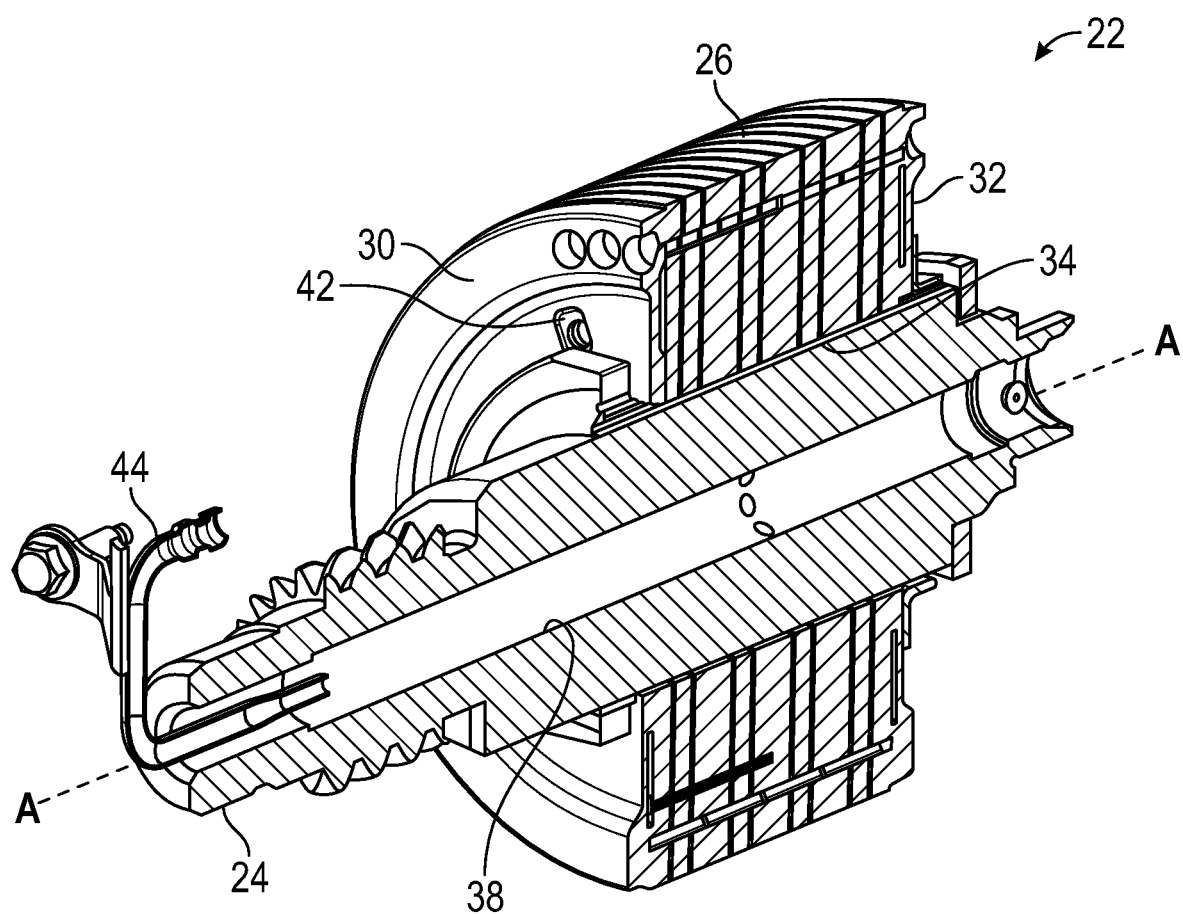
FIG. 3 is a cross-sectioned view of the rotor taken along section line B-B in FIG. 2, according to an exemplary embodiment.
Figure 4:
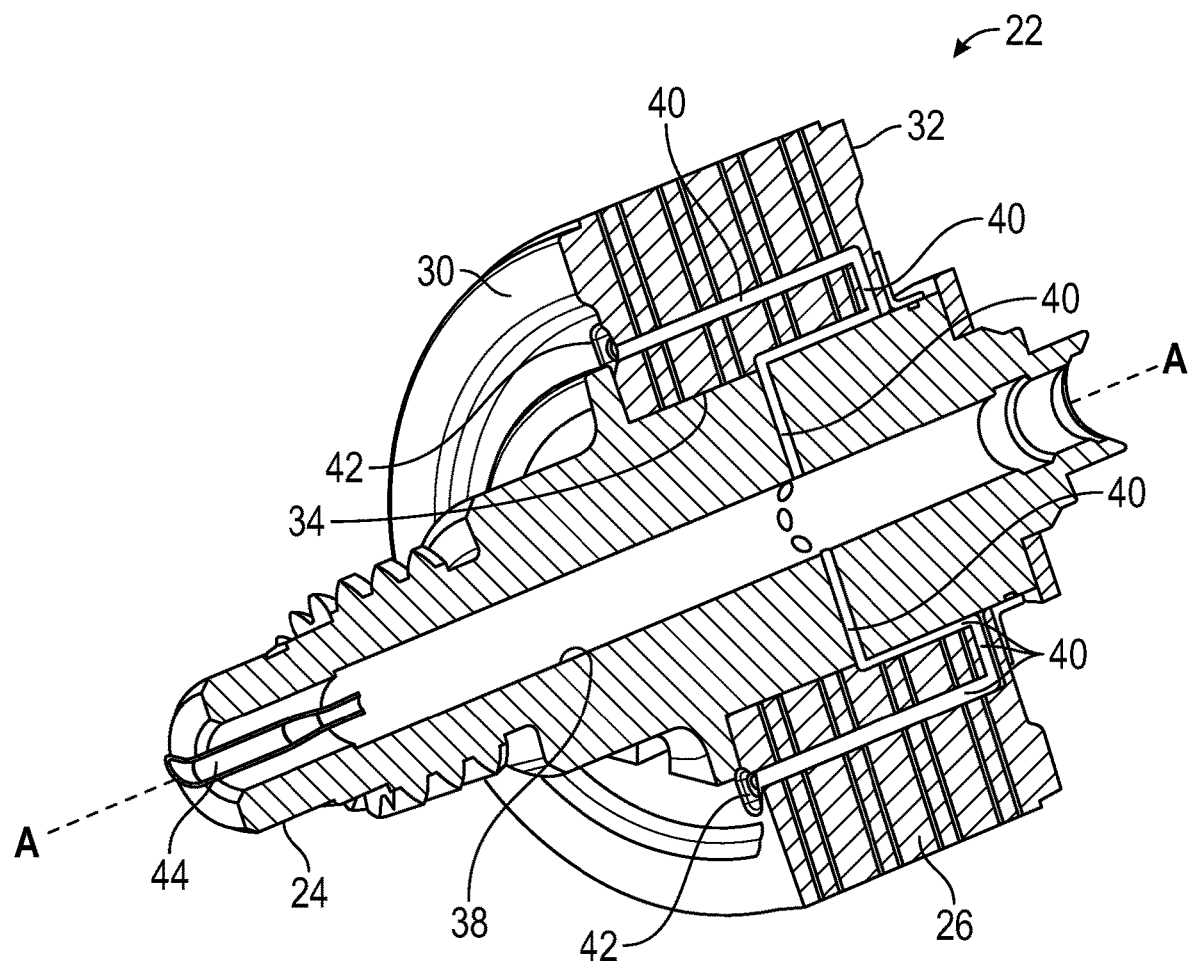
FIG. 4 is a cross-sectioned view of the rotor taken along section line C-C in FIG. 2, according to an exemplary embodiment.
Figure 5:
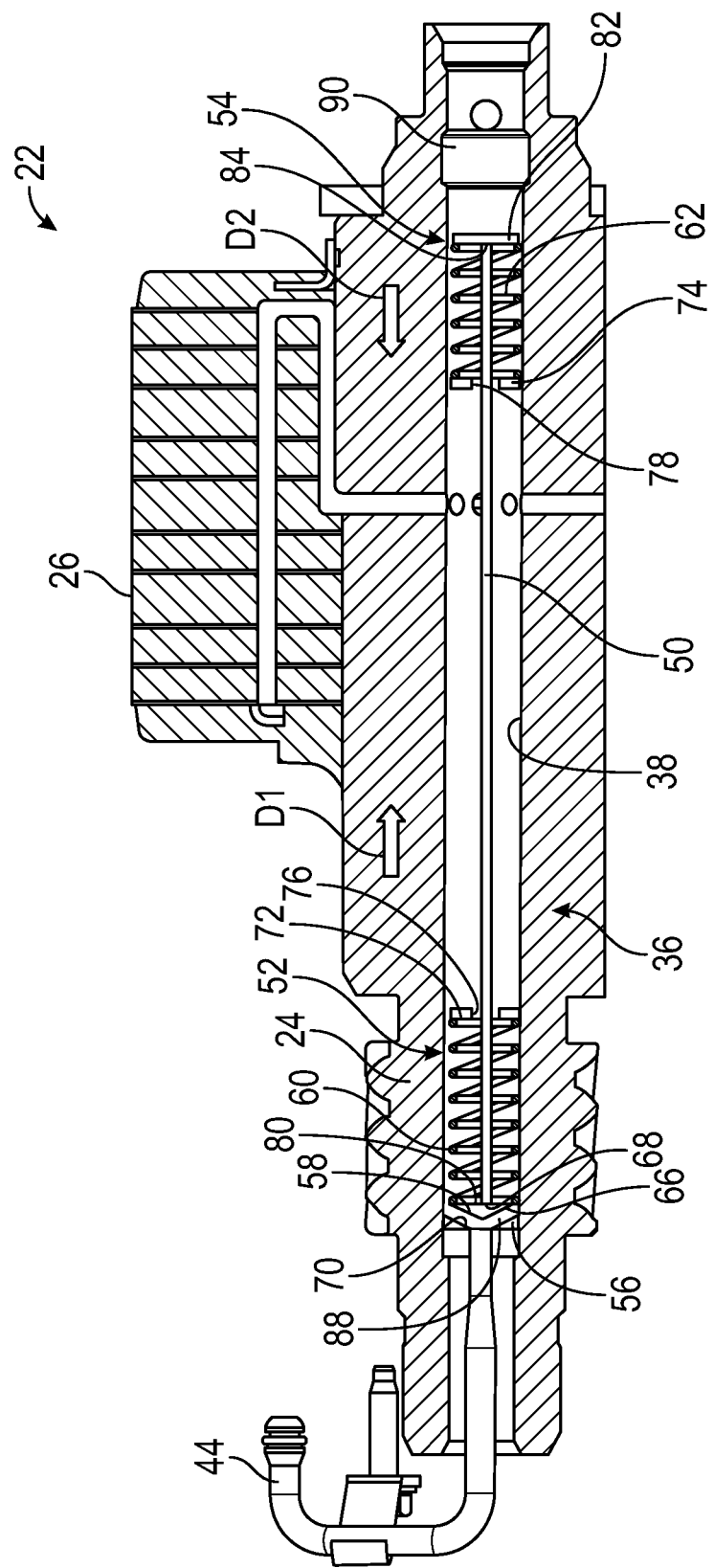
FIG. 5 is another cross-sectioned view of the rotor including a valve located within a passageway of the output shaft, where the valve includes a shape memory alloy actuator, according to an exemplary embodiment.

FIG. 2 is a perspective view of the rotor 22 of the electric motor 12, FIG. 3 is a cross-sectioned view of the rotor 22 taken along section line B-B in FIG. 2, and FIG. 4 is a cross-sectioned view of the rotor 22 taken along section line C-C in FIG. 2. Referring to FIGS. 2 and 3, the rotor 22 includes a rotor core 26 comprising a plurality of laminations 28. The rotor core 26 defines a longitudinal axis A-A, a first face 30, a second face 32, an opening 34 extending from the first face 30 to the second face 32 of the rotor core 26, and a valve 36 (shown in FIG. 5). The opening 34 is oriented along the longitudinal axis A-A of the rotor core 26. The output shaft 24 is received by the opening 34 of the rotor core 26. The output shaft 24 defines a passageway 38 that extends along the longitudinal axis A-A of the rotor core 26. A coolant tube 44 is fluidly connected to the passageway 38 of the output shaft 24 and receives coolant from the upper sump 16 of the housing assembly 10 (FIG. 1). The coolant may flow into the passageway 38 of the output shaft 24 through the coolant tube 44. As seen in FIG. 5, the valve 36 is disposed within the passageway 38 of the output shaft 24. As explained below, the valve 36 controls the flowrate of the coolant flowing through the passageway 38 disposed within the output shaft 24 of the rotor 22.

In the non-limiting embodiment as shown in the figures, the electric motor 12 is an interior permanent magnet motor. However, it is to be appreciated that the figures are merely exemplary in nature and the disclosed valve 36 is not limited to interior permanent magnet motor applications. Indeed, the valve 36 may be employed in any electric motor where the rotor and stator have different heat generation and require coolant flow distribution control such as, for example, an induction motor, a surface permanent magnet motor, a switched reluctance motor, or an axial motor.

Referring to FIGS. 2 and 4, the coolant may exit the passageway 38 of the output shaft 24 and through a series of passageways 40 located within the output shaft 24 and the rotor core 26. The coolant may then exit the rotor core 26 though openings 42 located along the first face 30 of the rotor core 26. The lower sump 18 of the housing assembly 10 (shown in FIG. 1) then collects the coolant that flows from of the openings 42 in the rotor core 26.

Figure 6:
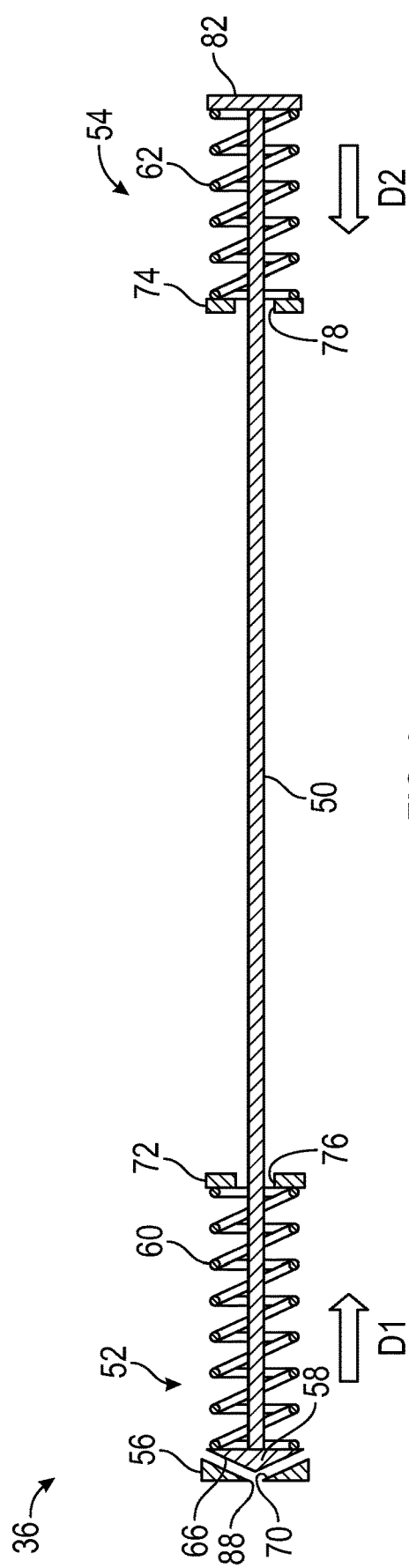
FIG. 6 is an illustration of the valve in a base flow position, according to an exemplary embodiment.
Figure 7:
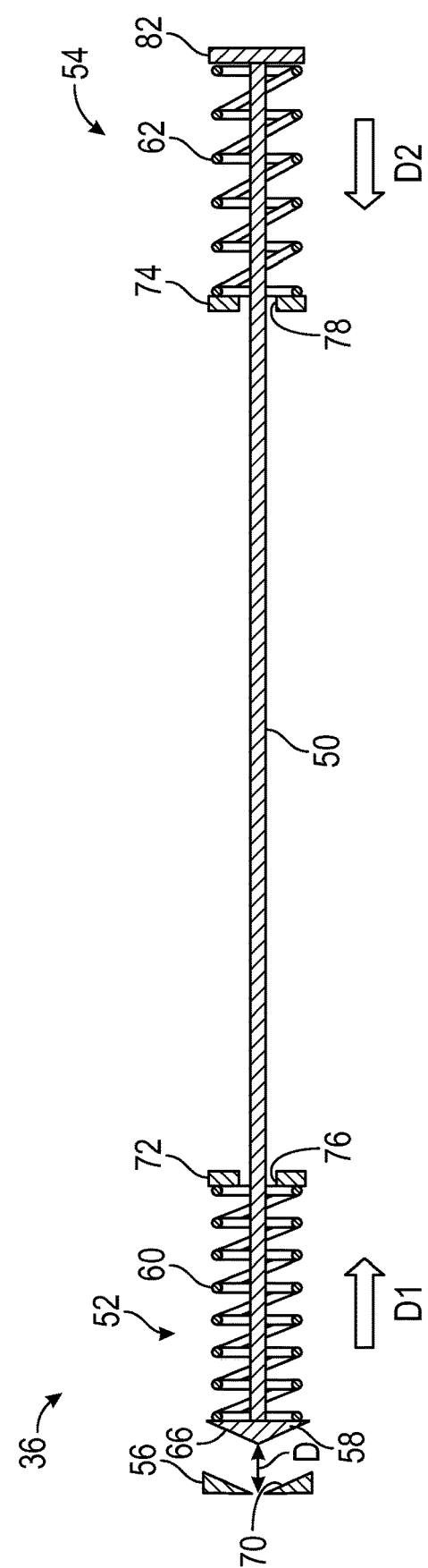
FIG. 7 is an illustration of the valve in a fully opened position, according to an exemplary embodiment.

Referring now to FIG. 5, the valve 36 includes a stem 50 having a first end portion 52 and a second end portion 54, a valve seat 56, a plug 58, a biasing member 60 disposed along the first end portion 52 of the stem 50, and a shape memory alloy actuator 62 disposed along the second end portion 54 of the stem 50. The plug 58 is disposed along the first end portion 52 of the stem 50 of the valve 36. Specifically, the plug 58 is disposed at a first end surface 68 of the stem 50 and is positioned to oppose the valve seat 56. The plug 58 defines a sealing surface 66 that corresponds to and seals against a seating surface 70 of the valve seat 56. As explained below, the valve 36 is actuated from a closed or base flow position seen in FIG. 5 and into a fully opened position (seen in FIG. 7) when the rotor 22 reaches a maximum operating temperature. Specifically, as explained below, the shape memory alloy actuator 62 expands from a compressed state (seen in FIGS. 5 and 6) into an expanded state (seen in FIG. 7) when heated to the maximum operating temperature. Referring to FIGS. 6 and 7, the biasing member 60 contracts as the shape memory alloy actuator 62 expands, thereby actuating the valve 36 into the fully opened positioned.

Referring specifically to FIGS. 5 and 6, it is to be appreciated that when the valve 36 is in the closed or base flow position, the sealing surface 66 of the plug 58 does not seal against the seating surface 70 of the valve seat 56. Instead, a clearance 88 is located between the plug 58 and the valve seat 56 to allow for a minimum or base amount of coolant to flow into the valve 36. Referring to FIG. 7, when the valve 36 is in the fully opened position, the plug 58 is located at a maximum distance D from the valve seat 56, thereby allowing a maximum amount of coolant to flow into the valve 36.

Referring to FIG. 5, the biasing member 60 is seated against a first holder 72 located within the passageway 38 of the output shaft 24, and the shape memory alloy actuator 62 is seated against a second holder 74 that is also located within the passageway of the output shaft 24. Both the first holder 72 and the second holder 74 of the valve 36 are spring holders that are fixedly located within the passageway 38 of the output shaft 24, and define corresponding apertures 76, 78 that are shaped to receive the stem 50 of the valve 36.

As seen in FIGS. 6 and 7, the biasing member 60 may compress against the first holder 72 in a first direction D1, which is oriented away from the valve seat 56. Referring to FIG. 5, the biasing member 60 is compressed between the first holder 72 and an end surface 80 of the plug 58 of the valve 36 when in the base flow position. The biasing member 60 exerts a biasing force in a direction that opposes the first direction D1 when the valve 36 is in the base flow position. That is, in other words, the biasing force is oriented in a direction that is opposite to a compressive force exerted upon the biasing member when the valve is in the base flow position. The biasing force exerted by the biasing member 60 retains the plug 58 in the base flow position as seen in FIG. 5, where the clearance 88 exists between the plug 58 and the valve seat 56 to allow the base amount of coolant to flow into the valve 36. The biasing member 60 is any type of element configured to exert the biasing force. For example, in the non-limiting embodiment as shown in the figures, the biasing member 60 is a coil spring constructed of materials such as, but limited to, hardened steel. However, it is to be appreciated that the biasing member 60 is not limited to coil springs. For example, in another embodiment, the biasing member 60 is a leaf spring or a dead weight that utilizes gravity or inertia to actuate.

Referring to FIGS. 6 and 7, the shape memory alloy actuator 62 is compressed in a second direction D2 against the second holder 74, where the second direction is opposite to the first direction D1. Referring back to FIG. 5, a piston 82 is disposed at the second end portion 54 of the stem 50. Specifically, the piston 82 is disposed at a second end surface 84 of the stem 50. The shape memory alloy actuator 62 is compressed between the second holder 74 and the piston 82 of the valve 36 when the valve 36 is in the base flow position. In the non-limiting embodiment as shown in FIG. 5, the shape memory alloy actuator 62 is located directly adjacent to an end plug 90 located within the passageway 38 of the output shaft 24. Specifically, the shape memory alloy actuator 62 is located in a position where the piston 82 may contact the end plug 90 when the valve 36 is in the fully opened position. However, it is to be appreciated that FIG. 5 is merely exemplary in nature, and the shape memory alloy actuator 62 may be positioned anywhere within the rotor 22 where the coolant experiences the maximum operating temperature. In the embodiment as shown in FIG. 5, the shape memory alloy actuator 62 is a coil spring. However, it is to be appreciated that in an alternative embodiment the shape memory alloy actuator 62 may also be a leaf spring, a wire that expands and contracts, or a cable including a plurality of wires that are twisted together to define a rope.

The shape memory alloy actuator 62 is constructed of a shape memory alloy having a phase transition temperature. When the coolant flowing through the passageway 38 of the output shaft 24 is at a lower temperature, the shape memory alloy is in a martensitic state and is compressed between the second holder 74 and the piston 82 of the valve 36, which is shown in FIGS. 5 and 6. However, as the electric motor 12 (FIG. 1) operates, the temperature of the coolant flowing within the passageway 38 of the output shaft 24 continues to increase until the shape memory alloy is heated to the phase transition temperature, and the shape memory alloys transitions from the martensitic state into an austenitic state.

Referring to FIGS. 5, 6, and 7, the shape memory alloy actuator 62 expands and exerts an actuation force in a direction that is opposite to the second direction D2. The actuation force is exerted by the shape memory alloy actuator 62 when the shape memory alloy transitions from the martensitic state to the austenitic state. Thus, the shape memory alloy is in the martensitic state when the valve 36 is in the base flow position (FIGS. 5 and 6) and in the austenitic state when the valve 36 is in the fully opened position (FIG. 7). It is to be appreciated that the actuation force exerted by the shape memory alloy actuator 62 when transitioning from the martensitic state to the austenitic state is greater than the compressive force exerted upon the biasing member 60 when the valve 36 is in the base flow position. Accordingly, the actuation force exerted by the shape memory alloy actuator 62 overcomes the biasing force exerted by the biasing member 60, and the biasing member 60 is compressed in the first direction D1 against the first holder 72. The shape memory alloy actuator 62 expands and urges the stem 50 of the valve 36 to translate in the first direction D1 into the fully opened positioned seen in FIG. 7. Specifically, the shape memory alloy actuator 62 expands and urges the stem 50 of the valve 36 and the plug 58 away from the valve seat 56 and into the fully opened position when the rotor 22 is at the maximum operating temperature.

It is to be appreciated that the phase transition temperature of the shape memory alloy of the shape memory alloy actuator 62 is about equal to the maximum operating temperature of the rotor 22. Accordingly, the specific material that is used for the shape memory alloy depends upon the operating characteristics of the rotor 22. For example, if the electric motor 12 (FIG. 1) is an interior permanent magnet motor, then the maximum operating temperature of the rotor 22 is about equal to a demagnetization temperature of one or more permanent magnets (not shown) embedded within the rotor 22. Accordingly, the valve 36 is actuated into the fully opened position to provide a maximum amount of coolant to the rotor 22 before the permanent magnets start to lose their magnetic strength. In another example, if the electric motor 12 is an induction motor, then the maximum operating temperature of the rotor 22 is about equal to a maximum winding temperature of the motor winding insulation.

Referring generally to the figures, the disclosed valve for a rotor of an electric motor provides various technical effects and benefits. Specifically, the shape memory alloy actuator of the valve serves as both a sensor and an actuator for adjusting the coolant flow rate based on an internal temperature of the rotor. The shape memory alloy is selected such that the transition temperature matches a maximum operating temperature of the rotor. Therefore, the disclosed valve is less complex and more cost-effective when compared to existing approaches currently available that employ separate temperature sensing, control, and actuation features for controlling the amount of coolant supplied to the rotor.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A rotor for an electric motor, the rotor comprising:
   a rotor core comprising a plurality of laminations, wherein the rotor core defines a longitudinal axis, a first face, a second face, and an opening extending from the first face to the second face of the rotor core, wherein the opening is oriented along the longitudinal axis;
   an output shaft received by the opening of the rotor core, wherein the output shaft defines a passageway extending along the longitudinal axis that receives coolant; and
   a valve disposed within the passageway of the output shaft, wherein the valve controls a flowrate of the coolant and is actuated into a fully opened position at a maximum operating temperature of the rotor, the valve comprising:
      a stem having a first end portion and a second end portion;
      a plug disposed at the first end portion of the stem;
      a valve seat disposed opposite to the plug; and
      a shape memory alloy actuator disposed along the second end portion of the stem that expands to urge the stem of the valve and the plug away from the valve seat and into the fully opened position when the rotor is at the maximum operating temperature.

2. The rotor of claim 1, wherein the valve includes a base flow position, and wherein the valve is actuated from the base flow position into the fully opened position.

3. The rotor of claim 1, wherein the shape memory alloy actuator is constructed of a shape memory alloy having a phase transition temperature.

4. The rotor of claim 3, wherein the phase transition temperature of the shape memory alloy is about equal to the maximum operating temperature of the rotor.

5. The rotor of claim 3, wherein the electric motor is a permanent magnet motor.

6. The rotor of claim 5, wherein the maximum operating temperature of the rotor is about equal to a demagnetization temperature.

7. The rotor of claim 1, wherein the shape memory alloy actuator is constructed of a shape memory alloy including a martensitic state and an austenitic state.

8. The rotor of claim 7, wherein the shape memory alloy is in the martensitic state when the valve is in a base flow position.

9. The rotor of claim 8, wherein the shape memory alloy is in the austenitic state when the valve is in the fully opened position.

10. The rotor of claim 1, wherein the shape memory alloy actuator is a coil spring, a leaf spring, a wire that expands and contracts, or a cable including a plurality of wires.

11. The rotor of claim 1, wherein the valve comprises a biasing member positioned along the first end portion of the stem, wherein the biasing member is compressed when the valve is in a base flow position.

12. The rotor of claim 11, wherein the biasing member exerts a biasing force in a direction that opposes a compressive force exerted upon the biasing member when the valve is in the base flow position.

13. The rotor of claim 12, wherein the shape memory alloy actuator is compressed when the valve is in the base flow position.

14. The rotor of claim 13, wherein the shape memory alloy actuator expands and exerts an actuation force in a direction opposite to the compressive force exerted by the biasing member when the shape memory alloy transitions from a martensitic state to an austenitic state.

15. The rotor of claim 14, wherein the actuation force exerted by the shape memory alloy actuator when transitioning from the martensitic state to the austenitic state is greater than the compressive force exerted upon the biasing member when the valve is in the base flow position.

16. A housing assembly for an electric vehicle, the housing assembly comprising:
   a main body defining an upper sump and a lower sump, wherein the upper sump contains a coolant;
   an electric motor located below the upper sump and above the lower sump of the main body, wherein the electric motor includes a rotor, and wherein the rotor comprises:
      a rotor core comprising a plurality of laminations, wherein the rotor core defines a longitudinal axis, a first face, a second face, and an opening extending from the first face to the second face of the rotor core, wherein the opening is oriented along the longitudinal axis;
      an output shaft received by the opening of the rotor core, wherein the output shaft defines a passageway extending along the longitudinal axis that receives the coolant from the upper sump; and
      a valve disposed within the passageway of the output shaft, wherein the valve controls a flowrate of the coolant and is actuated into a fully opened position at a maximum operating temperature of the rotor, the valve comprising:
         a stem having a first end portion and a second end portion;
         a plug disposed at the first end portion of the stem;
         a valve seat disposed opposite to the plug; and
         a shape memory alloy actuator disposed along the second end portion of the stem that expands to urge the stem of the valve and the plug away from the valve seat and into the fully opened position when the rotor is at the maximum operating temperature.

17. The housing assembly of claim 16, wherein the valve includes a base flow position, and wherein the valve is actuated from the base flow position into the fully opened position.

18. The housing assembly of claim 17, wherein the shape memory alloy actuator is constructed of a shape memory alloy including a martensitic state and an austenitic state.

19. The housing assembly of claim 18, wherein the shape memory alloy is in the martensitic state when the valve is in the base flow position.

20. The housing assembly of claim 18, wherein the shape memory alloy is in the austenitic state when the valve is in the fully opened position.

* * * * *